(12) United States Patent
Hagiwara et al.

(10) Patent No.: US 9,703,635 B2
(45) Date of Patent: Jul. 11, 2017

(54) METHOD, COMPUTER PROGRAM, AND COMPUTER FOR RESTORING SET OF VARIABLES

(71) Applicant: LENOVO (Singapore) PTE, LTD., New Tech Park (SG)

(72) Inventors: Mikio Hagiwara, Machida (JP); Eitaroh Kasamatsu, Kawasaki (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 75 days.

(21) Appl. No.: 14/717,820

(22) Filed: May 20, 2015

(65) Prior Publication Data

US 2015/0378846 A1    Dec. 31, 2015

(30) Foreign Application Priority Data

Jun. 27, 2014    (JP) .................................. 2014-106076

(51) Int. Cl.
*G06F 11/00*    (2006.01)
*G06F 11/14*    (2006.01)
(Continued)

(52) U.S. Cl.
CPC ........ *G06F 11/1417* (2013.01); *G06F 9/4401* (2013.01); *G06F 11/1415* (2013.01);
(Continued)

(58) Field of Classification Search
CPC ............. G06F 11/1417; G06F 11/1438; G06F 11/1415
See application file for complete search history.

(56) References Cited

U.S. PATENT DOCUMENTS 8,712,968 B1 *    4/2014    Chester ............... G06F 11/1417
                                                    707/649
2005/0039081 A1    2/2005    Chang et al.
(Continued)

FOREIGN PATENT DOCUMENTS

JP    2000-235483    8/2000
JP    2002-14818    1/2002
(Continued)

OTHER PUBLICATIONS

Unified Extensible Firmware Interface Specification, Version 2.3.1, Apr. 6, 2011.

*Primary Examiner* — Charles Ehne
(74) *Attorney, Agent, or Firm* — Kunzler Law Group

(57) ABSTRACT

A set of variables referred to by unified extensible firmware interface (UEFI) firmware is restored. The UEFI firmware stored in a read-only memory (ROM) is firstly executed after power-up. The UEFI firmware writes a variable set related to boot, into a variable area. As an operating system (OS) also writes a set of variables into the variable area, the boot-related variable set may be altered. The variable set is saved into a prescribed area, such as a universal serial bus (USB) memory key, when the computer boots normally. If alteration of the variable set in the reference area is detected during a boot of the computer, the variable set in the reference area is replaced with the saved variable set. The variable set alteration may be detected using a detection flag which is set immediately after a boot is started and reset immediately before an OS is loaded.

20 Claims, 6 Drawing Sheets

(51) Int. Cl.
*G06F 9/44* (2006.01)
*G06F 21/57* (2013.01)
*G06F 21/72* (2013.01)

(52) U.S. Cl.
CPC ........ *G06F 11/1438* (2013.01); *G06F 21/572* (2013.01); *G06F 21/575* (2013.01); *G06F 21/72* (2013.01)

(56) References Cited

U.S. PATENT DOCUMENTS

| | | | | |
|---|---|---|---|---|
| 2014/0095854 | A1* | 4/2014 | Chen | G06F 9/4403 713/1 |
| 2014/0281577 | A1* | 9/2014 | Nicholes | G06F 21/85 713/189 |
| 2015/0143098 | A1* | 5/2015 | Arnold | G06F 8/665 713/2 |
| 2015/0186161 | A1* | 7/2015 | Cho | G06F 9/4401 713/2 |

FOREIGN PATENT DOCUMENTS

| | | |
|---|---|---|
| JP | 2003-345617 | 12/2003 |
| JP | 2009-015818 | 1/2009 |
| JP | 2010-073193 | 4/2010 |
| JP | 2013-140536 | 7/2013 |
| JP | 2013-156799 | 8/2013 |

* cited by examiner

METHOD, COMPUTER PROGRAM, AND COMPUTER FOR RESTORING SET OF VARIABLES

FIELD

The presented embodiments relate to a technique for recovering a computer which has become unable to be started, and further to a technique for restoring a set of variables referred to by system firmware.

BACKGROUND

A computer has firmware installed therein. Firmware provides an interface between hardware and a higher-level program such as an operating system (OS), a device driver, or an application. Firmware can be classified into two groups: device firmware specializing in controlling peripheral devices, and system firmware (also called "platform firmware") responsible for operations of the entire system.

System firmware is generally stored in a firmware read-only memory (ROM) mounted on the motherboard. A basic input output system (BIOS) is system firmware which has been installed in many computer systems. The BIOS carries out power-on self-test (POST) and password processing after the computer is turned on and before the OS starts loading, and also provides services for allowing higher-level programs to access hardware.

With recent advancement of hardware, however, it has become difficult for the BIOS to support such advanced hardware. The unified extensible firmware interface (UEFI) forum has developed a UEFI specification as new system firmware that replaces with the conventional, legacy BIOS. The UEFI firmware has adopted a mechanism for emulating the legacy BIOS to maintain backward compatibility. Through the past several years, hardware and software have been developed stepwise from those compatible with the legacy BIOS to those compatible with the UEFI firmware.

In a system having the UEFI firmware installed therein, a UEFI-compatible OS, which operates in a UEFI native mode, and a UEFI-incompatible OS, which operates in a legacy BIOS compatibility mode, may both operate. At present, most personal computers (PCs) record global variables (GVs) in the non-volatile memory which stores the UEFI firmware. A vendor may write GVs into the non-volatile memory by using a GV identifier, VendorGuid. An OS or an application is allowed to rewrite the GVs.

SUMMARY

System firmware such as the legacy basic input/output system (BIOS) or unified extensible firmware interface (UEFI) firmware needs to refer to the data written in a firmware read-only memory (ROM) which is accessible immediately after the powering-on of the machine, in order to perform device recognition and initialization at the time of boot. Hereinafter, such data (variables) indispensable to the boot will be referred to as configuration variables (CVs).

The CVs include the following information: device attribute information and parameters that the UEFI firmware sets to the device at the pre-boot stage; setting information, such as the type of the device, operating mode of the device, and activation/deactivation of the device, that a user has set by calling a setup screen; a path to the partition where the boot image is stored; and the type of the operating system (OS) to be loaded.

Here, pre-boot refers to processing that the system firmware performs, in the state where the system is in a power-off state (e.g., an advanced configuration and power interface (ACPI) S5 state) or in a hibernation state (e.g., an ACPI S4 state), after the machine is turned on, and before the OS starts loading. Herein, "boot" refers to a series of processes performed from the powering-on of the machine, via the pre-boot, to the completion of loading of the OS and OS application. A boot from the power-off state (S5 state) or the hibernation state (S4 state) is called "cold boot."

Conventionally, many of the CVs were recorded on a complementary metal-oxide-semiconductor memory (CMOS) supported by a real-time clock (RTC) coin battery as power supply. Recently, CVs are also written into the firmware ROM which stores the UEFI firmware. Further, while the OS, the UEFI application, and the OS application are running, they are able to freely write environment variables for customizing themselves, debug logs, or damp files such as error logs, into the firmware ROM, without being limited by the specifications of the UEFI firmware. Herein, such data thus created by the OS, the UEFI application, and the OS application will be referred to as user variables (UVs).

The firmware ROM includes a code area for storing the system firmware, and a variable area for recording variables. For writing data into the variable area by utilizing the variable services, any program is required to set parameters by calling SetVariable( ), which is a function defined in the UEFI specification. In the UEFI specification, there is no restriction on the use of the variable area, except for the authentication service as will be described later. The OS and OS application operating in the UEFI native mode may freely write UVs into the variable area by utilizing the variable services. As a result, in the variable area, the CVs and general variables (GVs) written by the UEFI firmware as well as the UVs and GVs written by the UEFI application, the OS, and the OS application are recorded.

As the operating environment of the system firmware has completely shifted from the legacy BIOS to the UEFI firmware and the variable area has become open to the OS and the OS application, it has recently been found that the computer may have trouble in booting. For example, when the OS or the OS application is to write a UV, if it erroneously sets the variable name (VariableName) or identifier (VendorGuid) of a CV or GV in SetVariable( ), then the CV or the GV may be rewritten.

Further, the UEFI firmware may erroneously write or update a CV or GV. Furthermore, there is a risk that the CVs or GVs are rewritten or erased intentionally by malware. The CVs are data indispensable for configuring hardware at the pre-boot. The GVs also include data related to the pre-boot. If they are erroneously rewritten, boot of the system will become impossible, making the user's recovery work difficult.

The UEFI specification offers an authentication service (Variable Authentication) in which a parameter to be set in SetVariable( ) is hashed for write protection. Using this authentication service can prevent the CVs from being overwritten by the OS or OS application. However, if an electrical noise occurs due to an instantaneous power interruption or the like while the OS or the UEFI application is accessing the variable area, the CVs and/or GVs may be damaged.

Further, in the UEFI specification, the OS and the OS application are allowed to rewrite the GVs. Therefore, the authentication service cannot protect the GVs. The GVs include boot-related data about the types and priority orders of startup disks named Boot####, BootOrder, Driver####, DriverOrder, and Key####, and data about paths to input/output consoles such as Conin and Conout. These GVs are defined in the UEFI specification. If the boot-related data of the GVs are erroneously rewritten by the OS or the OS application, or altered by the power supply noise, then the boot may become impossible.

The firmware ROM storing the UEFI firmware is mounted on the system substrate and prevented from being easily detached. Further, the firmware ROM is hardware-write-locked so as not to be rewritten by the OS or the OS application. The system unlocks the write lock only immediately after power-up and executes the firmware ROM firstly, to prevent it from being started by an external device or by an unauthorized program. Therefore, it is not possible to restore the altered CVs or GVs by executing the code stored in a device other than the firmware ROM immediately after power-up.

Further, the firmware ROM holds default values for the CVs and the GVs. Thus, if a user can display a setup screen by depressing a function key (such as the "F1" key or the "F3" key) immediately after the startup, it will be possible to initialize the CVs and the GVs. However, in order for the pre-boot to proceed to the stage where the setup screen can be displayed, the UEFI firmware needs to refer to many variables. Therefore, it is often the case that the setup screen cannot be displayed when the variables have been altered. Furthermore, when the variables are initialized, the system conditions will change. Thus, it will be convenient if the variables can be restored with the minimum possible influence on the system.

A method is disclosed for a computer to restore a set of variables referred to by system firmware firstly executed after power-up. A set of variables is written into a reference area of the system firmware. The set of variables at the time when the computer was booted normally is saved into a prescribed area. Next, during a boot of the computer, it is detected that the set of variables in the reference area has been altered. In response to the detection, the set of variables in the reference area is replaced with the saved set of variables. Therefore, in any of the case where the set of variables was erroneously altered by the system firmware, the case where it was altered by a program other than the system firmware, and the case where it was altered by a power supply noise, the set of variables may be returned to the state at the time when the computer was booted normally. When all the sets of variables in the reference area, including those written by the OS or the OS application, are replaced with normal variable sets, they may be restored such that there is little change in the operating environment from that before the alteration was made.

The system firmware may be the UEFI firmware. The alteration may be detected by detecting that the boot has halted before initiation of loading of an operating system. In order for the boot to proceed to the state where the setup screen can be displayed, the system firmware refers to many sets of variables. Therefore, if any set of variables has been altered, it is highly likely that the boot processing cannot proceed to that stage. The alteration may be detected before the boot proceeds to the state where the setup screen provided by the system firmware can be displayed.

The event that the set of variables has been altered may be detected by setting a detection flag after the start of a previous boot, resetting the detection flag immediately before initiation of loading of an operating system, and checking the detection flag in a current boot. At this time, the detection flag may be checked immediately after completion of initialization of any device necessary for the system firmware to check the detection flag. Further, the detection flag may be checked before the system firmware which has started the boot refers to the set of variables written in the reference area. Further, a device may be initialized using a prescribed value after the current boot is started and before the detection flag is checked and, after the detection flag is checked, the device may be initialized again by referring to the variable set. As a result, it is possible to prevent such an undesirable event that the detection flag cannot be checked when a boot is started in the state where the set of variables has been altered.

At the current boot, the detection flag may be set immediately after the step of checking the detection flag. As a result, even if the set of variables has been altered at the current boot, the variable set may be restored by checking the detection flag at a next boot. The detection flag is reset immediately before initiation of loading of the operating system. This means that the detection flag may be reset only when the boot processing by the system firmware has finished. Therefore, at a next boot, when the detection flag has been reset, the system may determine that the set of variables has not been altered.

The set of variables at the time when the computer was booted normally may be saved using a setup screen of the system firmware. Further, the set of variables may also be saved, at each boot, immediately before initiation of loading of an operating system. This completely eliminates the chance for a program other than the system firmware to alter the set of variables after the boot succeeds and before the set of variables is saved.

The reference area may be set in the firmware ROM storing the system firmware, and the restoration code performing the replacing processing and the saved set of variables may be stored in a non-volatile memory different from the firmware ROM. A digest of the restoration code may be calculated, and the digest may be encrypted using a cryptographic key held by the computer. At the time of replacement, the digest may be used to verify that the restoration code has not been altered. At the time of saving the set of variables, a digest of the set of variables to be saved may be calculated, and the digest may be encrypted using a cryptographic key held by the computer. At the time of replacement, the digest may be used to verify that the set of variables has been extracted from the computer.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
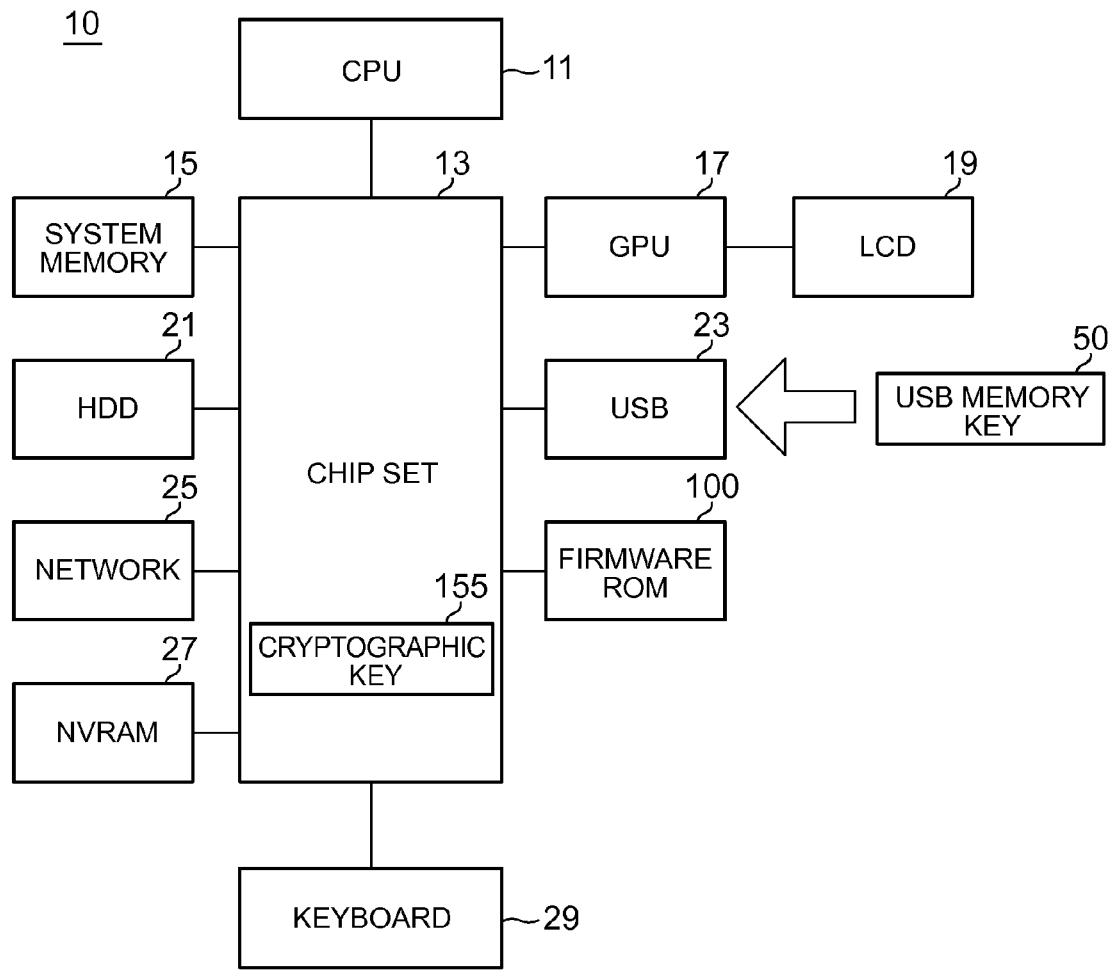
FIG. 1 is a schematic functional block diagram illustrating the primary hardware configuration of a personal computer.

FIG. 1 is a functional block diagram illustrating the primary hardware configuration of a laptop or desktop personal computer (PC) 10. As the configurations of many hardware components are well known, a description will be given here only to the extent necessary for understanding the present invention. A chip set 13 includes interface functions of various standards, and a central processing unit (CPU) 11, a system memory 15, a graphics processing unit (GPU) 17, a hard disk drive (HDD) 21, a universal serial bus (USB) connector 23, a network module 25 for connecting to a wired or wireless local area network (LAN), a non-volatile memory (NVRAM) 27, and a keyboard 29 are connected to the chip set 13. A liquid crystal display (LCD) 19 is connected to the GPU 17. The chip set 13 also has a serial peripheral interface (SPI) controller to which a firmware read-only memory (ROM) 100 is connected.

The chip set 13 stores a cryptographic key 155 for encrypting a digest of a variable restoration code 150f and a digest of a set of variables (variable set) 205, which will be described later. The cryptographic key 155 is desirably unique data that can distinguish the PC 10 from other computers, such as the Intel® management engine (ME) platform key, for example, or identification information associating the PC 10 with a unified extensible firmware interface (UEFI) firmware 150, as will be described in conjunction with FIG. 2.

The HDD 21 is a startup disk, which stores a boot image of the UEFI-compatible operating system (OS) of the PC 10. The HDD 21 may have a plurality of partitions into which different boot images, including one for a UEFI-incompatible OS, are respectively stored. The HDD 21 has a boot sector which stores an OS loader for loading the OS boot image. A USB memory key 50 for use in restoring the variable set can be attached to the USB connector 23. While the PC 10 allows a user to attach the USB memory key storing the OS boot image to the USB connector 23 and load the boot image, it does not allow the user to store the system firmware in advance and execute it immediately after power-up.

Figure 2:
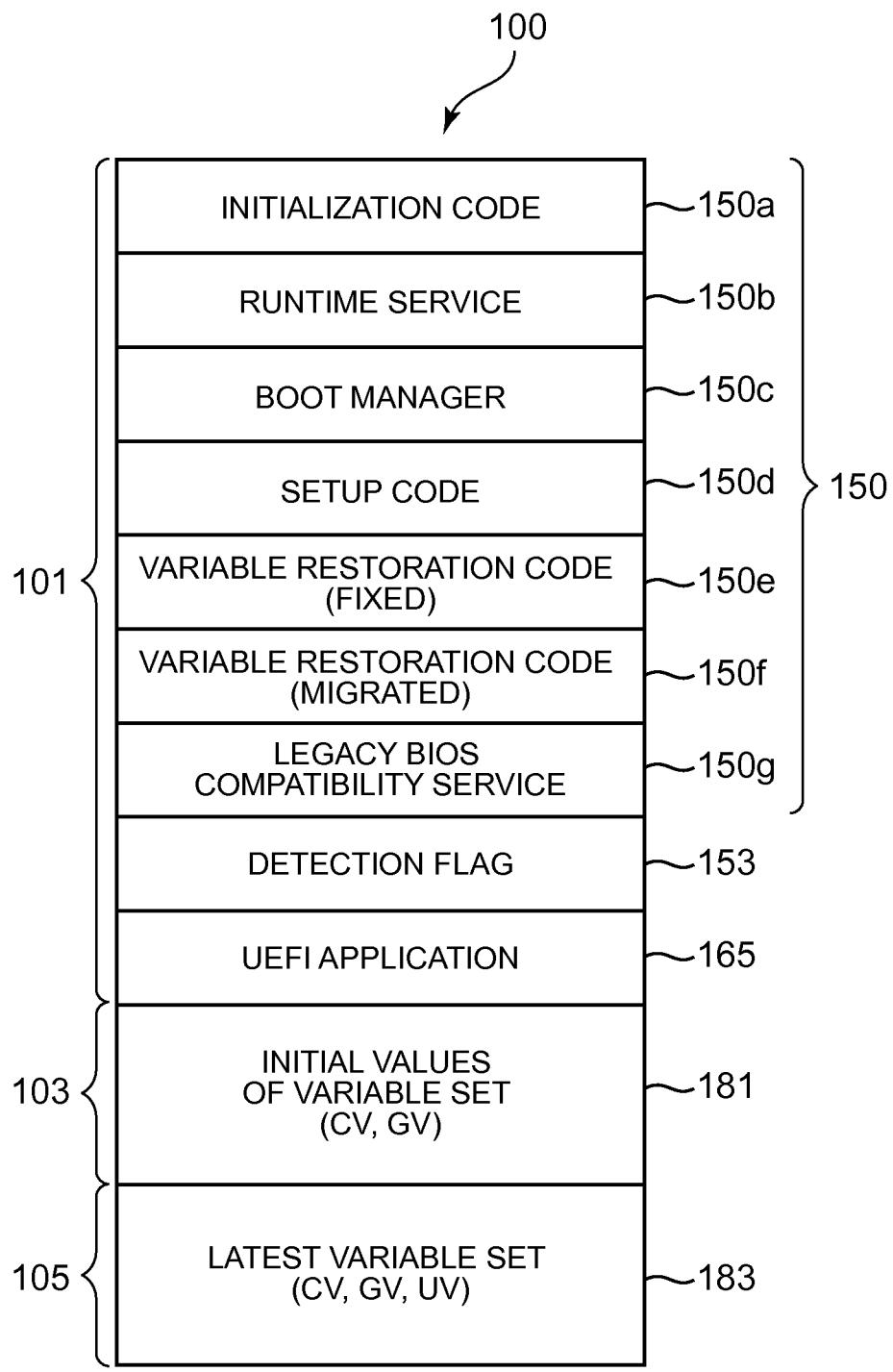
FIG. 2 illustrates an exemplary data structure of a firmware ROM.
Figure 3:
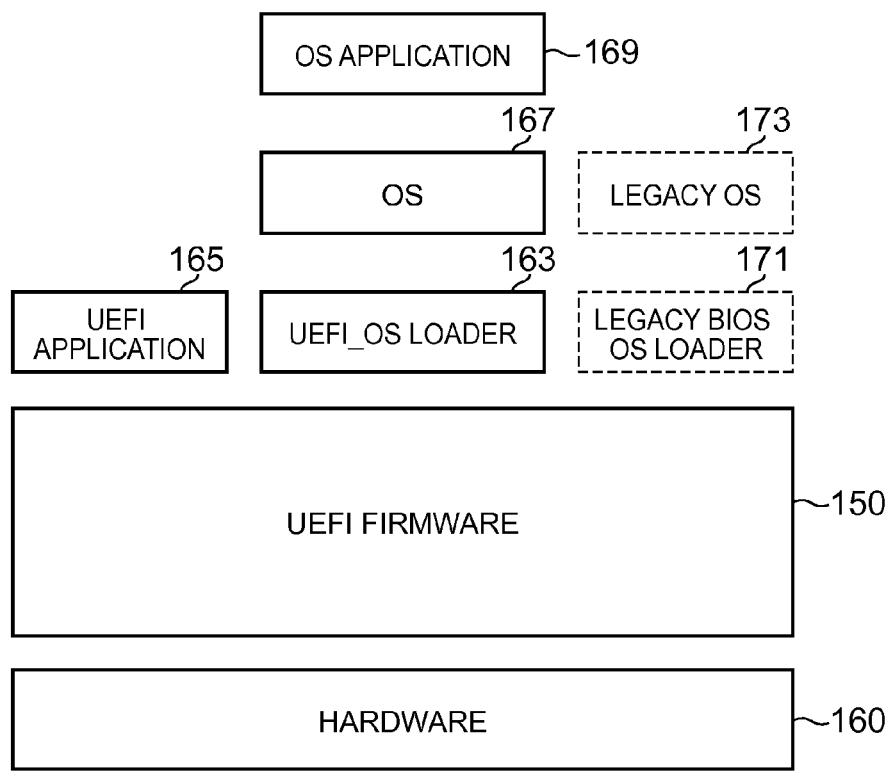
FIG. 3 illustrates the hierarchical structure of software, in its running state, installed in the personal computer.

FIG. 2 illustrates the data structure of the firmware ROM 100, and FIG. 3 illustrates the hierarchical structure of software which has been loaded into the system memory 15 and is running. The firmware ROM 100 is a non-volatile, electrically rewritable flash memory. By way of example, the firmware ROM 100 is partitioned into three blocks: a code area 101, a default area 103, and a variable area 105.

A recording area, which may be write-locked with the serial peripheral interface (SPI) controller of the chip set 13, is assigned to the code area 101 and the default area 103. No data may be written into the write-locked recording area until the chip set 13 is reset. The variable area 105 may not be write-locked, because it records the general variables (GVs) that may be rewritten by an OS 167 or an OS application 169 (FIG. 3) as ensured in the UEFI specification. The UEFI firmware 150 attains an executable state in response to the chip set 13 being reset, and applies write lock before passing the right for access to the CPU 11, to the OS 167.

The variable area 105 may be divided into an area storing configuration variables (CVs) alone and an area storing GVs and user variables (UVs), and write-lock only the former area. Applying the write lock may prevent the variables from being altered by the OS 167 or the OS application 169. However, there still remain the possibilities that the variables may be erroneously altered by the UEFI firmware 150 itself or altered by the power supply noise.

The code area 101 stores the UEFI firmware 150, a detection flag 153, and an UEFI application 165. The default area 103 stores initial values 181 of the GVs and the CVs. It should be noted that the detection flag 153 may be stored in a storage area, such as the complementary metal-oxide-semiconductor memory (CMOS) area in the chip set 13, which is accessible without referring to a variable set 183 in advance. In the variable area 105, the variable set 183 of any of the CVs, the GVs, and the UVs is recorded by the UEFI firmware 150, the UEFI application 165, the OS 167, or the OS application 169 while it is running. The initial values 181 of the variable set stored in the default area 103 are written before shipment of the PC 10 or when the UEFI firmware 150 is updated.

The UEFI firmware 150 updates the CVs and the GVs in accordance with the changes in the operating environment of the system. The UEFI specification states that the GVs are disclosed such that the UEFI application 165, the OS 167, and the OS application 169 may refer to or update them. Therefore, while the GVs and the CVs recorded in the variable area 105 are initial values at first, they are rewritten and/or added as the PC 10 boots repeatedly. In response to the CVs being erroneously rewritten by the UEFI firmware 150 or rewritten due to the power supply noise, the system may not be able to perform pre-boot normally next time. Similarly, in response to the boot-related data of the GVs being erroneously rewritten by the OS 167 or the OS application 169, the system may not be able to perform pre-boot.

The UEFI firmware 150 includes an initialization code 150a, a runtime service 150b, a boot manager 150c, a setup code 150d, variable restoration codes 150e, 150f, and a legacy BIOS compatibility service 150g. The UEFI firmware 150 holds a public key issued by the UEFI firmware manufacturer in a signature database, so that the UEFI firmware 150 may be updated only after the integrity is verified.

Further, in response to the system being reset at power-on (cold boot), the system sets, in the CPU 11, a reset vector which executes the initialization code 150a in the firmware ROM 100. In response to the PC 10 being cold-booted, the initialization code 150a detects, tests, and initializes, within a required range, basic devices such as the CPU 11, the system memory 15, and the primary controllers of the chip set 13, which are necessary for loading the UEFI firmware 150 into the system memory 15 and starting the execution thereof.

The initialization code 150a also initializes prescribed devices, such as the remaining controllers of the chip set 13 and the peripheral devices, and causes them to be ready for use, during the period from when the CPU 11 was reset to when the control is transferred to an UEFI_OS loader 163. The initialization code 150a tests consistency or integrity of the other codes stored in the code area 101, and it halts the boot if any falsification is found.

The runtime service 150b provides variable services related to the variable set, a time information service, and a virtual memory service. The boot manager 150c performs boot processing and password authentication processing. The boot manager 150c refers to the GVs, and loads the UEFI application 165, an UEFI driver, and the UEFI_OS loader 163 (a legacy BIOS_OS loader 171 when booting a legacy OS 173), into the system memory 15. After the pre-boot is finished, immediately before the right for access to the CPU 11 is transferred from the UEFI firmware 150 to the OS 167, the boot manager 150c reads the UEFI_OS loader 163 into the system memory 15 and verifies the integrity.

The boot manager 150c compares the hash value calculated from the code of the UEFI_OS loader 163 with the hash value of the digital signature decrypted using the public key acquired from the signature database, and if they match, the boot manager 150c determines that the integrity has been maintained, and permits execution of the UEFI_OS loader 163. The setup code 150d displays a setup screen on the LCD 19 in response to a prescribed function key in the keyboard 29 being depressed at the stage of pre-boot.

A user may use the setup screen to determine the priority orders of the startup disks, set the startup method, set the device to be used, set the password, and set the power management. Further, in response to the previous boot being successful, in the current boot, the user may display the setup screen and save the variable set 183 recorded in the variable area 105, as variables for use in recovery, into the USB memory key 50 or the NVRAM 27.

The setup code 150d writes the setting information, input through the setup screen, into the variable area 105 and other storage area. The user may change the values in the variable area 105 back to the initial values 181 through the setup code 150d. In order for the pre-boot processing to proceed to the state where the setup screen may be displayed, the initialization code 150a needs to refer to many variable sets 183 to initialize most devices. Therefore, it is often the case that the setup screen may not be displayed if any variable set 183 has been altered. The variable restoration codes 150e, 150f perform processing of replacing the variable set in the variable area 105 with the variable set saved in the USB memory key 50 or the NVRAM 27, as will be described in conjunction with FIGS. 5 and 6.

In an example, the variable restoration code 150f, in its execution, is written into the USB memory key 50 or the NVRAM 27, as will be described later. The variable restoration codes 150e, 150f are coded such that they may perform the restoration processing without referring to the variable set, by holding the parameters required for the device initialization as prescribed initial values. The variable restoration codes 150e, 150f are thus unaffected by the alteration of the variable set 183.

The legacy BIOS compatibility service 150g provides a legacy BIOS-compatible interface for the legacy OS 173 which is incompatible with the UEFI. For utilizing the legacy BIOS-compatible interface, the legacy OS 173 calls an INT** interrupt routine. It however does not include the interrupt routine related to the variable services, so the legacy OS 173 may not utilize the variable services. The legacy OS 173 is thus unable to write the UVs into the variable area 105.

Figure 4:
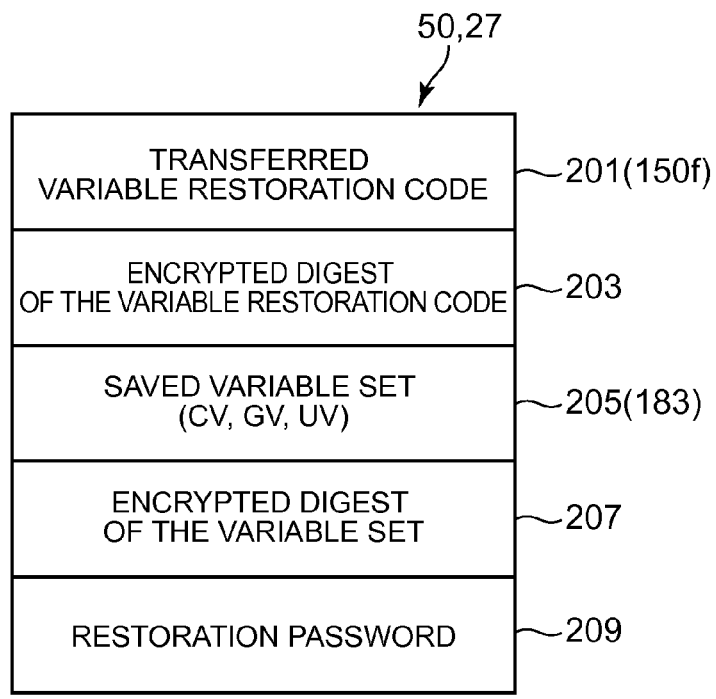
FIG. 4 illustrates the data structure of a universal serial bus (USB) memory key or a non-volatile random access memory (NVRAM)

FIG. 4 illustrates the data structure of the USB memory key 50 or the NVRAM 27. Representing the both, the USB memory key 50 stores: a variable restoration code 201, which is the variable restoration code 150f transferred thereto; an encrypted digest 203 which is the digest of the variable restoration code 150f encrypted using the cryptographic key 155; a variable set 205, which is the variable set 183 (recorded in the variable area 105) transferred thereto; and an encrypted digest 207 which is the digest of the variable set 205 encrypted using the cryptographic key 155.

In the following, to distinguish between the state of being stored in the firmware ROM 100 and the state of being stored in the USB memory key 50 (or the NVRAM 27), the variable restoration code and the variable set in the latter state are indicated using the reference numerals 201 and 205, respectively. The USB memory key 50 also stores a restoration password 209 for use in user authentication when restoring the variable set 183.

Figure 5:
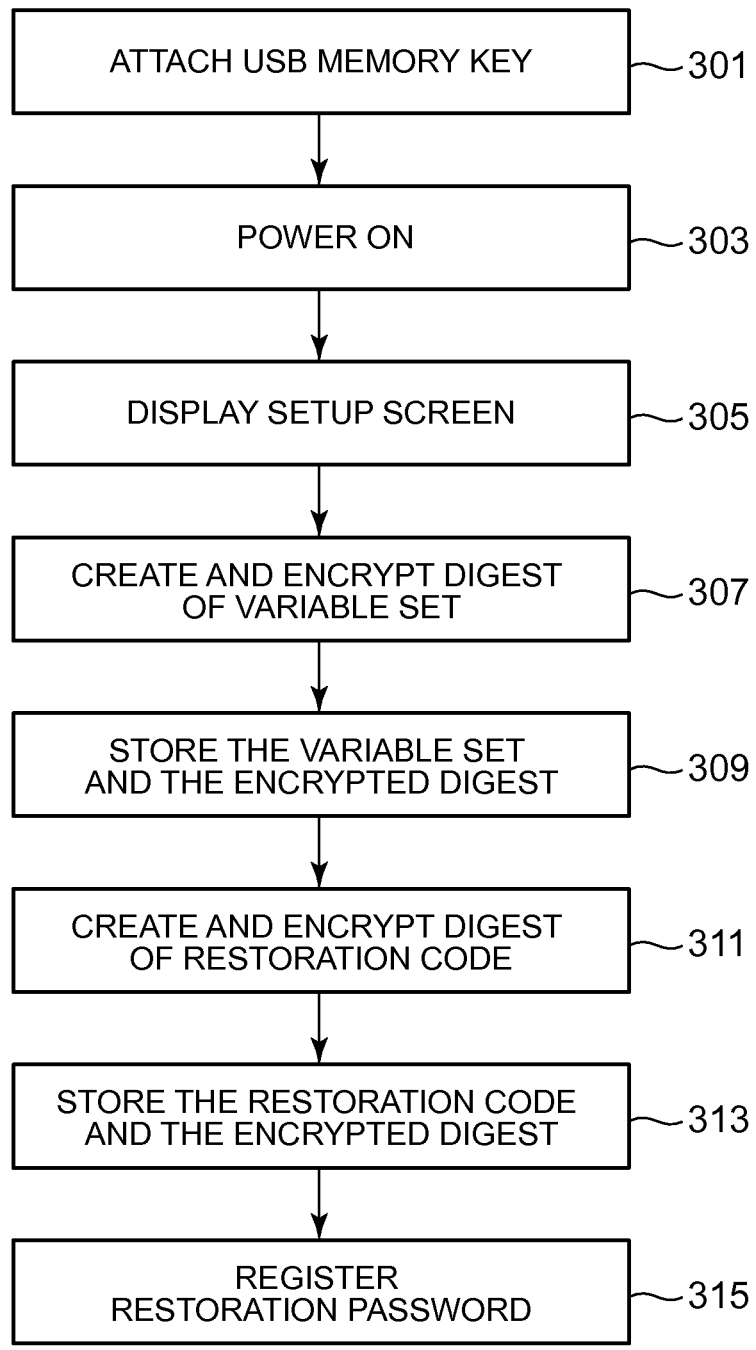
FIG. 5 is a flowchart illustrating the procedure for storing a set of variables into the USB memory key or the NVRAM.
Figure 6:
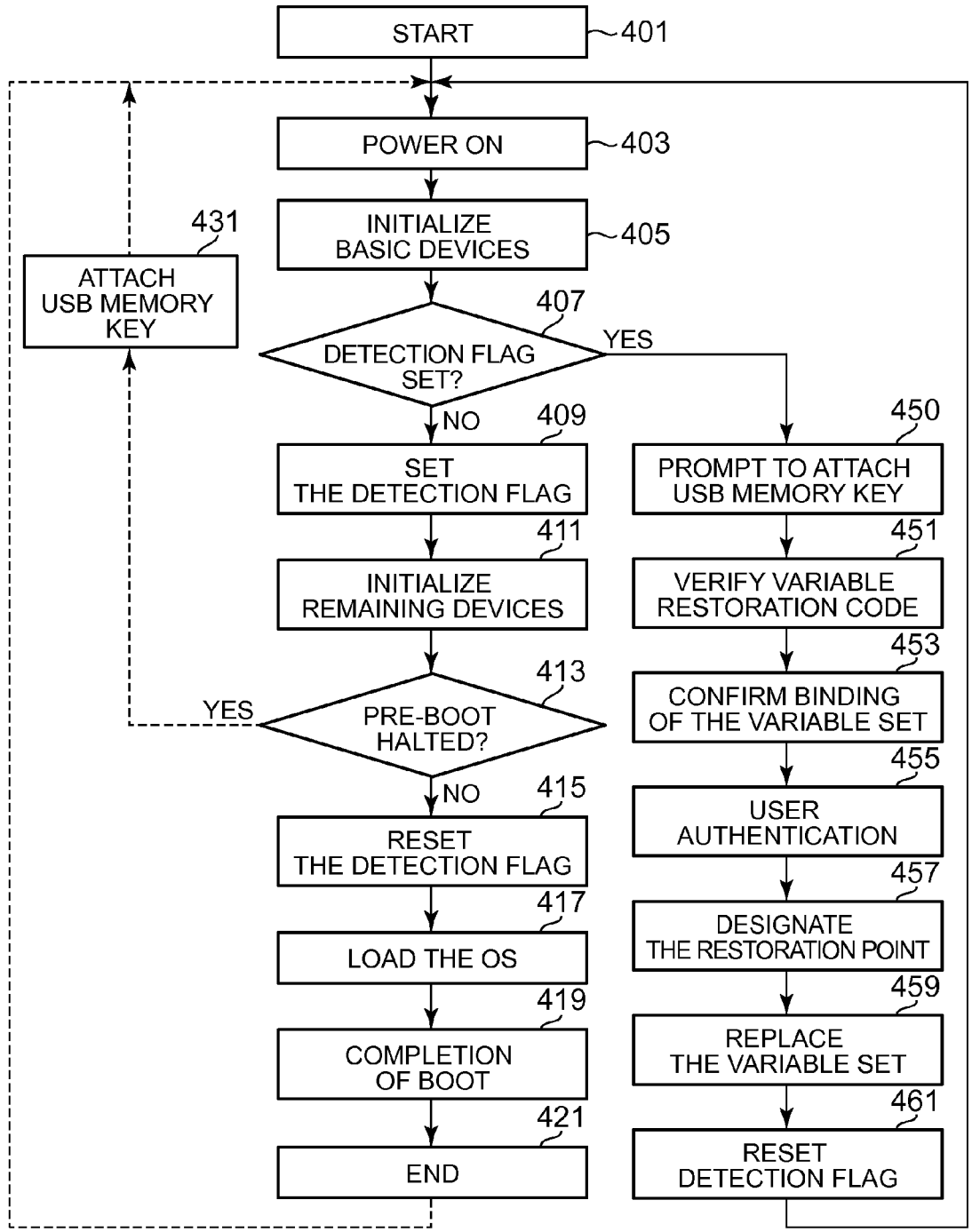
FIG. 6 is a flowchart illustrating the procedure for restoring the set of variables using the USB memory key.

FIGS. 5 and 6 are flowcharts illustrating how the UEFI firmware 150 restores the altered variable set 183 using the USB memory key 50. FIG. 5 illustrates the procedure of storing the data shown in FIG. 4 into the USB memory key 50. FIG. 6 illustrates how the PC 10 to which the USB memory key 50 has been attached restores the variable set 183 stored in the variable area 105. The procedure in FIG. 5 is also applicable to the case where the data is stored into the NVRAM 27.

In block 301 of FIG. 5, the USB memory key 50 is attached to the PC 10. In block 303, the computer is turn on to start a cold boot. As the OS 167 and the OS application 169 are operating stably after the success of the previous boot, the user has confirmed that the variable set related to the boot is normal. In block 305, the user depresses a prescribed function key immediately following the powering-on, to call the setup code 150d to display a setup screen on the LCD 19. The setup screen displays a menu for storing data into the USB memory key 50. In the state where the setup screen is displayed, most devices have been initialized and become available to the UEFI firmware 150.

In block 307, in response to the user selecting from the menu an option to save the variable set 183, the variable restoration code 150e creates a digest by calculating the hash value of the variable set 183 stored in the variable area 105. Further, the variable restoration code 150e encrypts the digest using the cryptographic key 155. In block 309, the variable restoration code 150e stores the variable set 183 and its digest as the variable set 205 and the encrypted digest 207, respectively, into the USB memory key 50.

In response to there not being enough space in the firmware ROM 100, the variable restoration code 150f may be downloaded from a Web site under the operating environment of the OS 167, and stored into the USB memory key 50. In the variable restoration code 150f thus downloaded, a digest encrypted using the manufacturer's private key is included as a digital signature. The public key for decrypting the digital signature is embedded in the UEFI firmware 150.

In block 311, in response to the user selecting from the menu an option to store the variable restoration code 150f, the variable restoration code 150e encrypts, using the cryptographic key 155, a digest created by calculating the hash value of the variable restoration code 150f. In block 313, the variable restoration code 150e stores the variable restoration code 150f and its encrypted digest as the variable restoration code 201 and the encrypted digest 203, respectively, into the USB memory key 50. Thereafter, the user keeps the USB memory key 50 until a boot fails. The variable set 183, however, may be changed as the PC 10 boots repeatedly, and it is thus desirable that blocks 307 and 309 are executed as appropriate. In block 315, the user selects from the menu an option to register a password, and registers a restoration password 209 into the USB memory key 50 using the keyboard 29.

Responsive to a cold boot, the variable restoration code 150e may display a prompt prompting the user to save the variable set 183 into the USB memory key 50, at an appropriate timing calculated on the basis of the elapsed time or the number of times of boot. In the case where the variable area 105 is divided into an area for storing the CVs and only the GVs related to pre-boot and into an area for storing the UVs and the remaining GVs, the USB memory key 50 may store only the CVs and the GVs related to pre-boot. Here, the GVs related to pre-boot may be Boot####, BootOrder, Driver####, DriverOrder, and Key####, and the parameters corresponding to the GVs may be regarded as load options.

Next, the procedure for the PC 10 to restore the altered variable set by utilizing the USB memory key 50 will be described with reference to FIG. 6. In block 403, the computer is turned on to start a cold boot. Paths leading to block 403 include: a path from block 421 in the case where the previous boot was successful and the operations were stable; a path from block 461 in the case where the altered variable set 183 was restored; and a path from block 413 in the case where pre-boot failed. As will become apparent from the procedure described below, it is assumed that in response to the previous pre-boot failed, the user attaches the USB memory key 50 to the computer before powering it on in the current boot.

In response to the CPU 11 receiving a reset signal, the CPU 11 initializes the internal cache and register after the voltage becomes stable. The chip set 13 switches a predetermined reset vector of the CPU 11 to the address of the initialization code 150a. The CPU 11 accesses the reset vector to fetch an instruction of the initialization code 150a.

In block 405, the CPU 11 reads the UEFI firmware 150 stored in the code area 101, into the cache, and initializes basic devices necessary for executing the UEFI firmware 150 related to the restoration, such as the system memory 15 and the chip set 13. In response to the system memory 15 becoming available, the initialization code 150a loads the UEFI firmware 150 into the system memory 15.

In block 407, the variable restoration code 150e checks the detection flag 153. For setting/resetting the detection flag 153, either positive logic or negative logic may be used. The initialization code 150a executed up to this point may be coded so as not to rely on the variable set 183. For example, it may be coded such that the devices are once initialized using default values, without referring to the variable set, and after the detection flag is checked, the devices are initialized again by referring to the variable set. Accordingly, even if the variable set 183 had been altered in the previous boot, the current boot may proceed to the block 407 without fail.

If the detection flag 153 is set, the process proceeds to block 450, and the processing of restoring the variable set 183 is carried out. If the detection flag 153 is not set, the process proceeds to block 409. In block 409, the variable restoration code 150e sets the detection flag 153 immediately after the procedural step in block 407. It is desirable that the variable restoration code 150e is coded such that this step may also be performed without relying on the variable set 183, so as to allow the variable restoration code 150e to detect the failure of the current pre-boot in a next pre-boot. In block 411, the initialization code 150a initializes the remaining devices, and the boot manager 150c performs processing necessary for pre-boot. In response to the block 411 being finished, the setup code 150d attains an executable state. In block 411, the UEFI firmware 150 refers to many variable sets 183.

Therefore, if any variable set 183 has been altered from its normal state, the procedural step in block 411 may not be completed, and the pre-boot halts. On the other hand, since the procedural steps in blocks 407 and 409 are performed before the block 411, even if there was an alteration of the variable set 183 in the previous boot, the steps in blocks 407 and 409 may be performed without being affected by the alteration. Block 413 indicates that the pre-boot halts in the middle of the procedural step in block 411 if the variable set 183 has been altered. The user may watch the screen on the LCD 19 and, when the loading of the OS 167 does not start, the user may determine that the pre-boot has halted.

In response to the user determining that the pre-boot has halted, the user attaches the USB memory key 50 in block 431, and restarts the PC 10 in block 403. The path leading from block 413 to block 403 via block 431 relies on the user operation, so the path is indicated by dotted lines. Likewise, the path from block 421 to block 403 is indicated by a dotted line, because it also relies on the user operation.

In response to the pre-boot being terminated normally in block 413, the process proceeds to block 415, in which the variable restoration code 150e resets the detection flag 153. The fact that the detection flag 153 has been reset means that the pre-boot was successful, which also means that the variable set 183 has not been altered. In response to the boot manager 150c verifying the integrity of the UEFI_OS loader 163 in block 417, the right for access to the CPU 11 is passed to the OS 167, and the loading of the OS 167 and the OS application 169 is started.

The procedural step in block 415 is performed, following the success of pre-boot, immediately before the right for access to the CPU 11 is transferred to the OS 167, so it is performed without fail as long as the pre-boot is successful. In block 419, the boot is completed, and the OS 167 and the OS application 169 start running. In the operations afterwards, the OS 167 or the OS application 169 may erroneously rewrite the variable set related to pre-boot which was written by the UEFI firmware 150. The variable set may be rewritten intentionally by malware, so as to remedy such problems at the next boot. In block 421, the current boot is completed and the computer is turned off.

In the case where the process proceeds from block 431 to block 403 and on, the detection flag 153 has not been reset. Thus, the process proceeds from block 407 to block 450. In block 450, the variable restoration code 150e may prompt the user, such as with a beep, to attach the USB memory key 50 if it has not been attached.

In block 451, the variable restoration code 150e compares the encrypted digest 203 decrypted using the cryptographic key 155 with the digest calculated from the variable restoration code 201 to verify the identity. The fact that they are identical means that the variable restoration code 150f has not been altered from the state in which it was stored in the firmware ROM 100. In the case where the variable restoration code 201 was downloaded from a Web site, the encrypted digest 203 is decrypted using the public key held by the UEFI firmware 150, and the identity is verified. Verifying that the variable restoration code 150f and the variable restoration code 201 are identical to each other may prevent a third party from accessing the PC 10 using an unauthorized variable restoration code. It is desirable that the variable restoration code 150e is coded such that it may also execute the procedural steps in blocks 450 and 451 without relying on the variable set 183.

In response to the verification of the variable restoration code 201 succeeding, in block 453, the CPU 11 executes the variable restoration code 201 stored in the USB memory key 50. The variable restoration code 201 uses the cryptographic key 155 to decrypt the encrypted digest 207 of the variable set, and compares it with the digest calculated from the variable set 205. Matching digests mean that the variable set 205 is the one extracted from the PC 10 associated with the cryptographic key 155 and that it has not been altered.

Therefore, it is not possible to write an unauthorized variable set into the variable area 105, or it is not possible to replace the variable set in the variable area with a variable set of another PC 10. In response to the verification of the binding between the variable set 205 and the PC 10 succeeding, in block 455, the variable restoration code 201 performs user authentication using the restoration password 209. Therefore, no other person may write a variable set into the variable area 105 using the USB memory key 50, even if it is the normal variable set 205 extracted from the PC 10.

Figure 7:
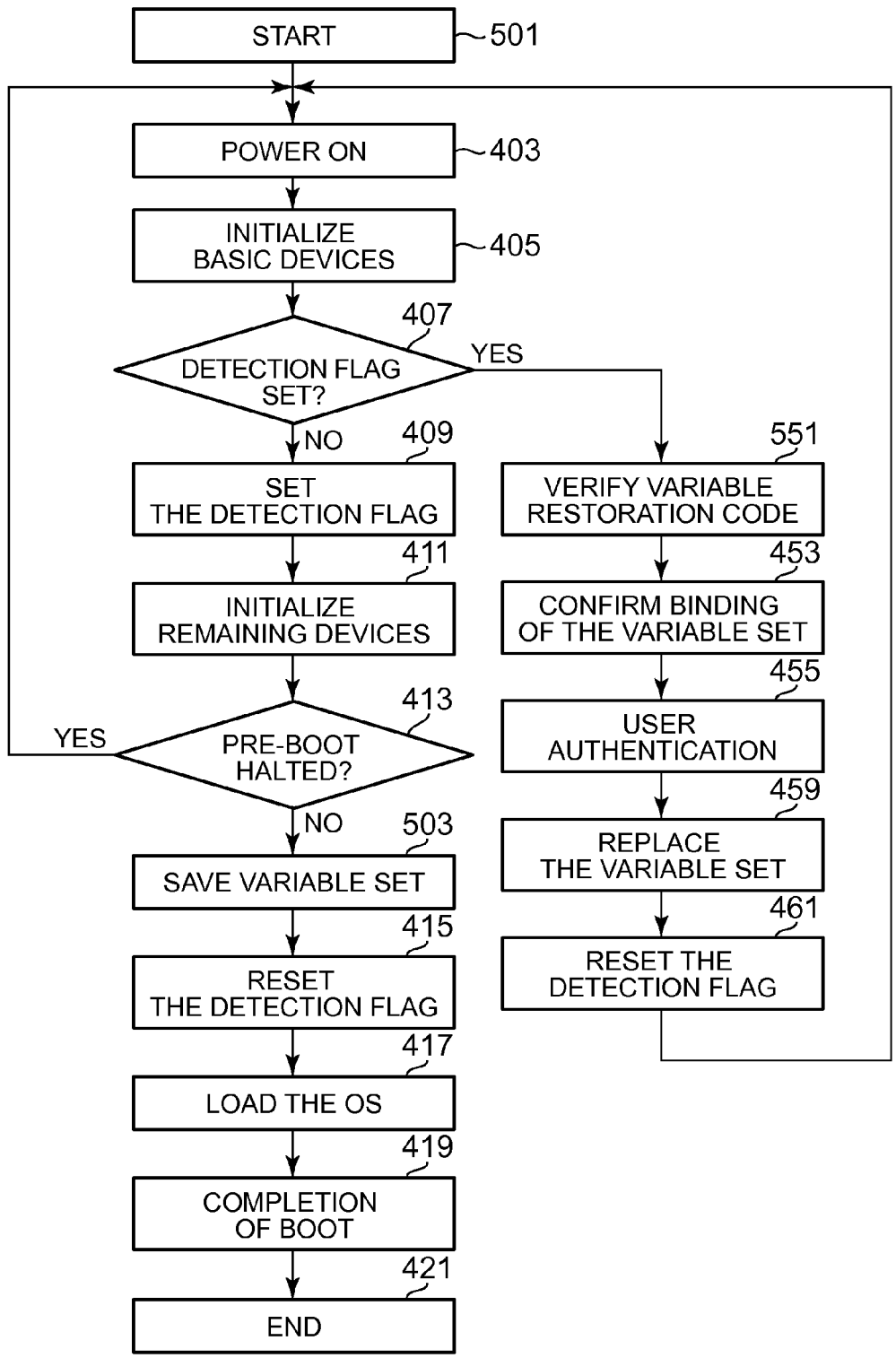
FIG. 7 is a flowchart illustrating the procedure for restoring the set of variables using the NVRAM.

The variable restoration code 201 may also be stored into the NVRAM 27 immediately before termination of each pre-boot, as will be described in conjunction with block 503 in FIG. 7. In block 457, the variable restoration code 201 may display on a setup screen, at an arbitrary timing, a prompt to cause the user to select which one to use for restoration: the variable set 205 stored in the USB memory key 50; or the variable set 205 that was saved immediately before the termination of the previous pre-boot. In block 459, the variable restoration code 201 writes the variable set 205 into the variable area 105 after clearing the variable set 183.

In block 461, the variable restoration code 201 resets the detection flag 153. In block 403, the user is prompted to remove the USB memory key 50, and the computer is then restarted. While the example of restoring the variable set 183 using the USB memory key 50 has been described above, the variable set 183 may also be restored using the NVRAM 27 in almost the same manner. In this case, the process returns automatically from block 413 to block 403, without going through block 431. Further, the procedural step in block 450 becomes unnecessary.

The procedure for the UEFI firmware 150 to restore the altered variable set 183 using the NVRAM 27 will now be described with reference to the flowchart in FIG. 7. In FIG. 7, the procedural steps identical to those in FIG. 6 are denoted by the same reference numerals and the description thereof will be omitted. Only the steps in the characteristic blocks 501, 503, and 551 will be described. The steps in blocks 450 and 457 in FIG. 6 have been deleted. In block 501, the variable set 205 and the variable restoration code 201 necessary for restoration are stored in the NVRAM 27.

In block 503, each time pre-boot succeeds, immediately before the detection flag 153 is reset, the variable restoration code 150e saves the variable set 183 into the NVRAM 27. As a result, in the NVRAM 27, unlike the case of storing the variable set into the USB memory key 50, a latest variable set with no possibility of alteration by the OS 167 or the OS application 169 may be stored.

In block 551, the variable restoration code 201 stored in the NVRAM 27 is verified in the same manner as in block 451. Thereafter, the variable restoration code 201 stored in the NVRAM 27 performs the restoration processing in the same manner as in the procedure in FIG. 6. It should be noted that not all the procedural steps in the flowcharts shown in FIGS. 5 to 7 are indispensable, or they do not restrict the orders in which the procedural steps are performed.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the above description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described above with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The code may be stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   writing a set of variables into a reference area of system firmware executed by a computer after power-up;
   saving, into a prescribed area separate from the reference area, the set of variables at the time when the computer was booted normally;
   detecting, by the computer, during a boot of the computer, whether the set of variables in the reference area has been altered; and
   replacing, by the computer, the set of variables in the reference area with the saved set of variables, in response to detecting that the set of variables was altered.

2. The method according to claim 1, wherein detecting whether the set of variables in the reference area has been altered includes detecting that the boot has halted before initiation of loading of an operating system.

3. The method according to claim 1, wherein detecting whether the set of variables in the reference area has been altered is performed before the boot proceeds to a state where a setup screen provided by the system firmware is displayed.

4. The method according to claim 1, wherein detecting whether the set of variables in the reference area has been altered includes:
   setting a detection flag after the start of a previous boot,
   resetting the detection flag immediately before initiation of loading of an operating system in the previous boot, and
   checking the detection flag in a current boot.

5. The method according to claim 4, wherein checking the detection flag is performed in response to completion of initialization of a device necessary for the system firmware to check the detection flag.

6. The method according to claim 4, wherein checking the detection flag is performed before the system firmware refers to the set of variables written in the reference area.

7. The method according to claim 4, further comprising:
   initializing a device using a prescribed value in response to starting the current boot and before checking the detection flag; and
   initializing the device again, in response to checking the detection flag, by referring to the variable set.

8. The method according to claim 4, wherein the current boot includes setting the detection flag immediately after checking the detection flag.

9. The method according to claim 1, wherein saving the set of variables is performed using a setup screen of the system firmware.

10. The method according to claim 1, wherein saving the set of variables is performed, at each boot, immediately before initiation of loading of an operating system.

11. The method according to claim 1, wherein saving the set of variables includes saving a set of variables written into the reference area.

12. The method according to claim 1, wherein the reference area is set in a firmware read-only memory storing the system firmware, and the saved set of variables are stored in a non-volatile memory different from the firmware read-only memory.

13. The method according to claim 12, further comprising:
   calculating a digest of the restoration code; and encrypting the digest using a cryptographic key held by the computer, wherein replacing the set of variables includes verifying the restoration code using the digest.

14. The method according to claim 1, wherein saving the set of variables includes:
   calculating a digest of the set of variables to be saved; and
   encrypting the digest using a cryptographic key held by the computer, wherein replacing the set of variables includes verifying, using the digest, that the set of variables has been extracted from the computer.

15. A computer program product comprising a computer readable storage medium that stores code executable by a processor, the executable code comprising code to perform:
   saving the set of variables into a prescribed area;
   starting a boot of a computer;
   detecting that the boot did not reach a stage of loading an operating system; and
   replacing the set of variables in the firmware read-only memory with the saved set of variables in response to the detection, wherein the prescribed area is memory location separate from the firmware read-only memory.

16. The computer program product according to claim 15, wherein detecting that the boot did not reach a stage of loading an operating system includes detecting, during a boot of the computer, that the set of variables in the reference area has been altered.

17. The computer program product according to claim 15, wherein detecting that the boot did not reach a stage of loading an operating system includes:
   setting a detection flag after the start of a previous boot;
   resetting the detection flag immediately before initiation of loading of an operating system in the previous boot; and
   checking the detection flag in a current boot.

18. The computer program product according to claim 15, wherein saving the set of variables includes:
   calculating a digest of the set of variables to be saved; and
   encrypting the digest using a cryptographic key held by the computer, wherein replacing the set of variables includes verifying, using the digest, that the set of variables has been extracted from the computer.

19. A computer having installed therein system firmware, the computer comprising:
   a processor;
   a system memory; and
   a non-volatile memory storing the system firmware and a set of variables referred to by the system firmware, wherein the system firmware is configured to:
   save the set of variables into a prescribed area;
   detect whether a boot reached a stage of loading an operating system; and
   replace the set of variables in the non-volatile memory with the saved set of variables in response to the detection, in response to the boot not reaching the stage of loading the operating system, wherein the prescribed area is memory location separate from the non-volatile memory storing the system firmware.

20. The computer according to claim 19, wherein the system firmware is unified extensible firmware interface (UEFI) firmware.

* * * * *